United States Patent [19]
Flynn

[11] 3,977,306
[45] Aug. 31, 1976

[54] AUTOMATIC CARTON SEALING SYSTEM

[75] Inventor: Edward S. Flynn, New Rochelle, N.Y.

[73] Assignee: Flynn Burner Corporation, New Rochelle, N.Y.

[22] Filed: May 15, 1975

[21] Appl. No.: 577,764

[52] U.S. Cl.................................. 93/36.3; 53/375; 93/DIG. 1
[51] Int. Cl.² .......................................... B31B 1/64
[58] Field of Search ........... 53/375, 388; 93/DIG. 1, 93/36 MM, 36 R, 36.3; 156/583

[56] References Cited
UNITED STATES PATENTS

| | | | |
|---|---|---|---|
| 2,783,693 | 3/1957 | Felber | 53/375 X |
| 3,236,160 | 2/1966 | Mullaney | 53/375 X |
| 3,610,114 | 10/1971 | Kaminsky | 93/36 MM X |
| 3,713,952 | 1/1973 | Schafer et al. | 53/375 X |
| 3,751,876 | 8/1973 | Oakley et al. | 53/375 |
| 3,777,448 | 12/1973 | Howe | 53/375 X |
| 3,785,255 | 1/1974 | Talbot et al. | 93/DIG. 1 X |

*Primary Examiner*—James F. Coan

[57] ABSTRACT

An automatic carton sealing system in which sealing is effected by the direct application of a gaseous flame to the surfaces to be sealed. In the system, an unsealed carton formed of paperboard stock coated with a thermoplastic layer and having a flap which extends outwardly with respect to a folded-in flap to define an open shed, is conveyed past a gas burner whose flam is projected into the shed to soften the layers on the flaps, the carton then passing through compression rollers which press the flaps together as the overlapping layers cool and harden to effect a bond therebetween. Included in the system is a conveyor-failure interlock acting to shut off the fuel mixture to the burner should conveyor movement be arrested, and a flame-failure interlock acting to arrest the conveyor should the flame be extinguished.

11 Claims, 10 Drawing Figures

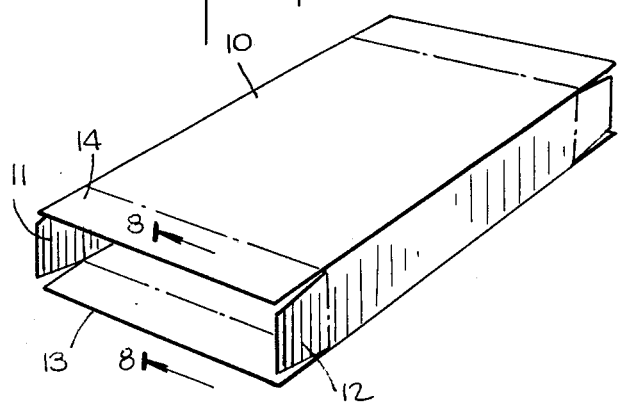
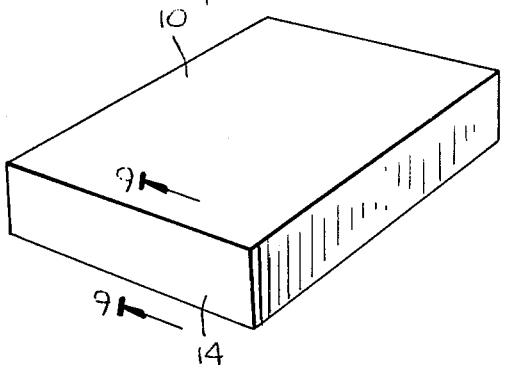
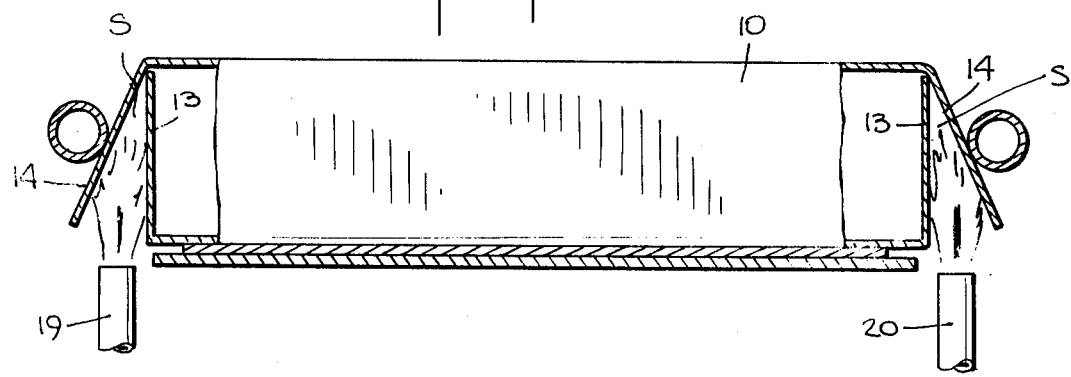
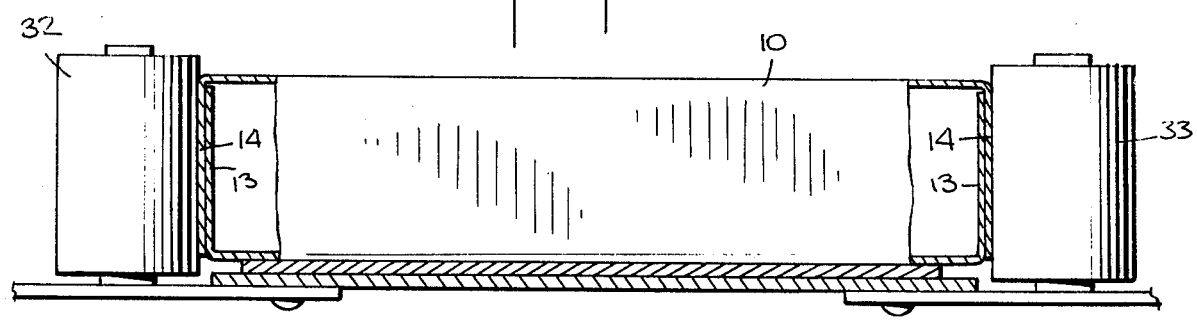
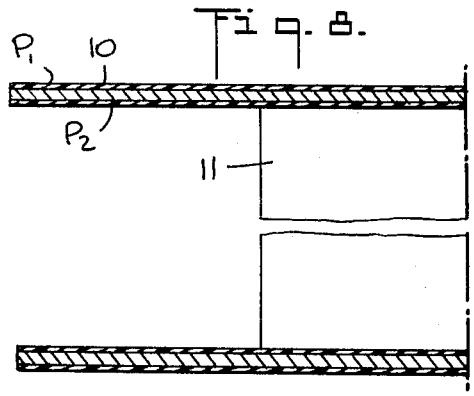
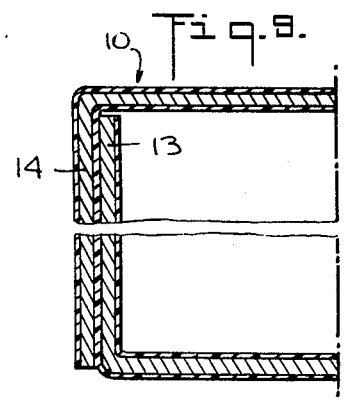

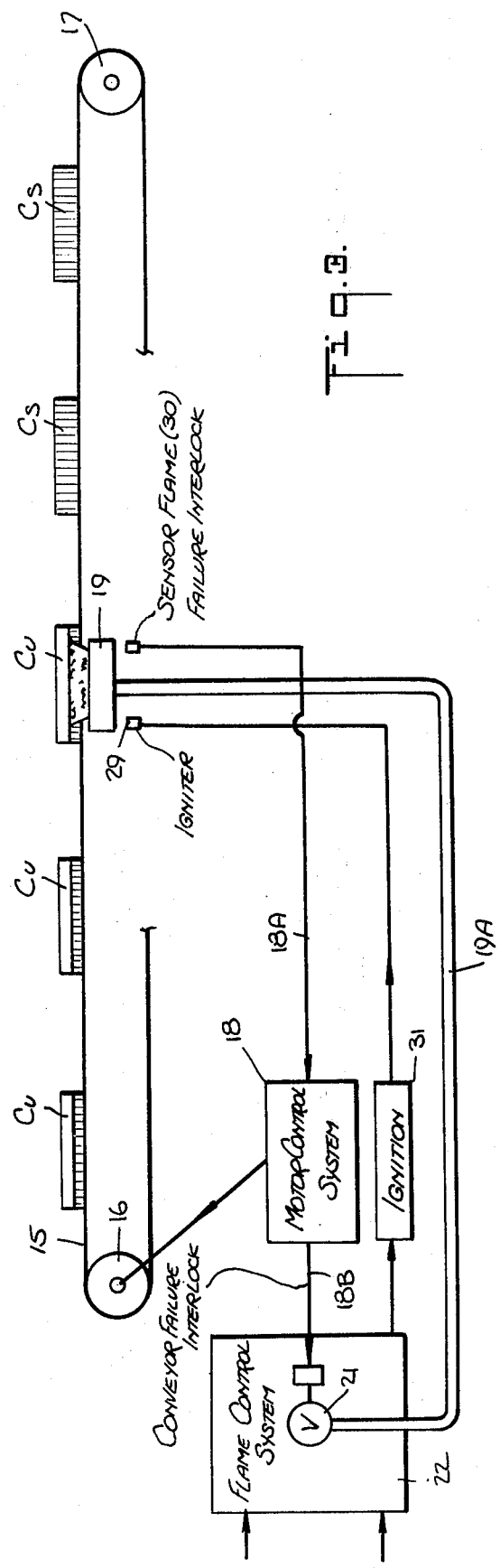
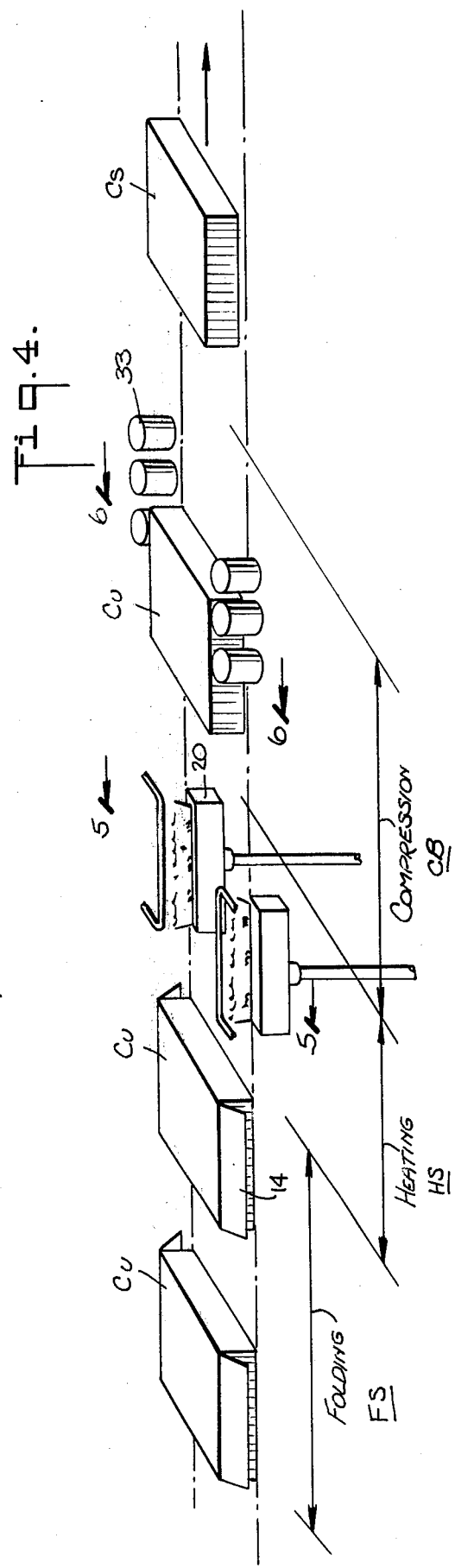

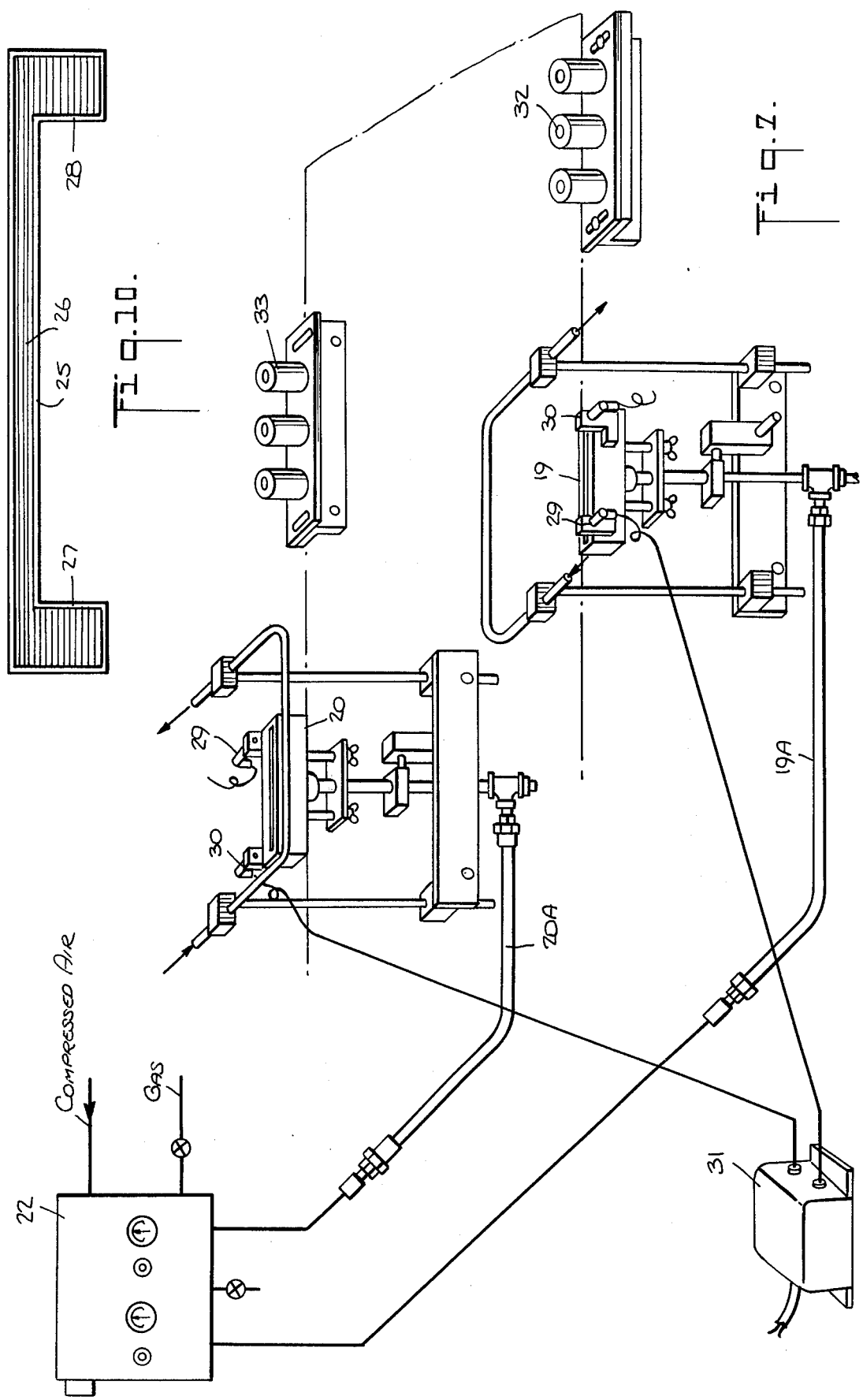

AUTOMATIC CARTON SEALING SYSTEM

BACKGROUND OF INVENTION

This invention relates generally to the sealing of paperboard cartons, and more particularly to an automatic carton sealing system in which sealing of the carton flaps is effected by direct application of a gaseous flame to the surfaces thereof.

In modern packaging techniques, the container for the goods usually takes the form of a carton made of paperboard stock coated on both faces with a leak-proof polyethylene layer. A carton of this type is initially blanked from coated paperboard stock having score lines to define the sides and flaps of the carton. The blank is folded and the sides are joined to create, when the blank is erected, an open-ended tube having a rectangular cross-section. The open ends of the box are provided with a pair of relatively small flaps referred to as dust flaps, and a pair of large flaps referred to as the upper major flap and the lower major flap.

In packaging goods in such cartons by automatic machinery, the usual procedure is to insert a product into the open-ended carton and to then fold in and seal the end flaps. In one such machine, after the product is inserted the dust flaps at both ends are first folded in and then the lower major flap is folded thereover, the upper edge of the lower flap being received and retained in the fold of the upper major flap which hinges outwardly.

To complete the package, it is then necessary to seal the upper major flap to the lower major flap of the carton. Heretofore, this was accomplished by blowing heated air through a triangular nozzle into the triangular shed defined by the unsealed major flaps to momentarily soften their polyethylene layers, the carton then being conveyed through compression rolls acting to press the upper major flap against the lower major flap to effect a bond therebetween upon cooling and hardening of the overlapping layers, which takes place during compression.

The use of heated air to effect sealing has a number of serious practical disadvantages. Because the heated air is introduced at high velocity from a fixed station into the triangular shed while the carton is being conveyed, unless the temperature of the air is high, it will not produce adequate softening of the thermoplastic layer to provide an effective bond. Since the heated air is introduced through a triangular nozzle that is coupled by an extended line or duct to a blower and heater assembly, the relatively small cross-sectional area of the nozzle produces an excessive pressure drop. And since the heated air is blown into an open shed to impinge on the flap layers, the air is deflected and discharged from the ends of the shed so that the heat exchange period between the air and the layers is quite brief.

The heated-air technique for sealing the flaps of cartons coated with a polyethylene layer has the advantage of being glueless, since it obviates the need to provide strips of glue on the interface of the flaps to be joined and to thereafter heat-soften the strips and press the overlapped flaps together to form a permanent bond.

But because the heated-air technique is characterized by poor heat exchange efficiency, sealing of the flaps may be incomplete or defective unless the thermoplastic layers on the flaps are subjected to heat for a sufficient period to adequatley heat the material above the softening point. Should the layers not be fully softened, the resultant joints will have inferior strength and be incapable of withstanding the usual stresses encountered by cartons in ordinary use.

In order, therefore, to insure adequate heating of the flaps by the heated-air technique, the carton must be run through the heating station at a relatively slow speed. This requirement is at the expense of the production rate which cannot be at high speed without sacrificing the quality of the joint.

SUMMARY OF INVENTION

In view of the foregoing, it is the main object of this invention to provide a direct flame technique which obviates the drawbacks incident to the heated-air technique for sealing polyolefin-coated cartons and which makes it possible to produce high-strength carton joints at exceptionally high production rates.

More particularly, an object of this invention is to provide an automatic carton sealing system in which each carton to be sealed is conveyed through a heating station, the upper major flaps of the carton being outstretched with respect to the folded-in lower major flaps to define therewith open-ended triangular sheds, the sheds of the conveyed cartons passing over respective rows of flames arising from gas burners, whereby the flames directly impinge on and immediately soften the layers on the flaps.

Among the significant features of the invention are the following:

a. The available thermal energy supplied by the gas burners is directly applied to the flaps rather than indirectly through a heated medium to effect more rapid softening of the polyethylene layers.

b. Relatively little thermal energy is wasted, for the heat is generated at the heating station rather than being transmitted thereto from a remote source.

c. Even though the burners are in continuous operation and no use is made of the gas flames in the intervals between successive cartons fed through the heating station, these intervals are brief, for the technique makes possible high-speed sealing operations.

d. Because the gas burners in the system are of the type which can be immediately ignited or extinguished, the burners and the carton conveyors are controllable to insure effective sealing of all cartons handled by the system.

Still another object of the invention is to provide a direct flame impingement technique for sealing cartons, wherein the surfaces to be sealed are subjected to an oxidizing flame to create a strong seal.

Also an object of the invention is to provide a direct flame carton sealing system having safety interlocks to extinguish the burners in the event movement of the conveyor is halted, thereby preventing burning of the cartons, and to arrest movement of the conveyor in the event the flame is extinguished, thereby preventing the passage of unsealed cartons through the system.

Yet another object of the invention is to provide an automatic carton sealing machine which operates reliably and efficiently, and which may be manufactured at relatively low cost.

Briefly stated, these objects are attained in a system in which an erected, open-ended carton, after being loaded with the goods to be packaged, is then subjected to a flap-folding operation in which first the dust flaps at both ends are folded in, after which the lower major flap is folded thereover and the upper major flap is brought down over the folded-in lower flap, whereby the upper edge of the lower flap is received and retained in the fold of the upper flap, which, being unsealed, hinges outwardly to define with the folded-in lower flap an open-ended triangular shed.

The carton in this unsealed condition is conveyed through a heating station that includes a pair of gas burners disposed adjacent the ends of the cartons, each burner producing rows of flames which projects into the sheds and directly heats and softens the interfacial polyethylene layers of the lower and upper major flaps, the carton then moving into a compression station in which the upper major flaps are pressed against the folded-in lower major flaps while the softened interfacial layers freeze to form a permanent bond between the major flaps.

OUTLINE OF THE DRAWINGS

For a better understanding of the invention as well as other objects and further features thereof, reference is made to the following detailed description to be read in conjunction with the accompanying drawings, wherein:

FIG. 1 shows, in perspective, a typical carton in the erected state, prior to sealing of the flaps;

FIG. 2 shows the same carton after it has been sealed;

FIG. 3 is a schematic diagram of a direct flame system in accordance with the invention for sealing cartons;

FIG. 4 schematically illustrates the folding, heating and compression stations of the system;

FIG. 5 is a transverse section taken through a carton as it passes through the heating station;

FIG. 6 is a transverse section taken through the same carton as it passes through the compression station;

FIG. 7 is a perspective view of the heating and compression stations;

FIG. 8 is a longitudinal section taken in the plane indicated by line 8—8 in FIG. 7;

FIG. 9 is a longitudinal section taken in the plane indicated by lines 9—9 in FIG. 7; and FIG. 10 is a plan view of one of the burners.

DESCRIPTION OF INVENTION

The carton: Referring now to FIGS. 1 and 2, there is shown a typical carton 10 whose flaps require sealing. The carton is formed from a blank of board stock which is suitably scored to form the four side walls or main panels as well as a pair of small dust flaps 11 and 12, a major lower flap 13 and a major upper flap 14.

The surfaces of the board stock are coated on either side with polyolefin material, such as the layers of polyethylene $P_1$ and $P_2$ shown in FIG. 8. In practice, these layers may be formed of wax, in which event the machine for sealing the flaps will be the same as that disclosed herein except that a cooling stage may be necessary to accelerate cooling during compression to ensure the completion of the bond between the interfacial wax layers before the compressive forces are released.

FIG. 1 shows the blank after it has been folded into tubular form, with the complemental side flaps thereof over-lapped and sealed. While the side flap sealing necessary to form the open-ended tube shown in FIG. 1 may be effected by a direct flame technique of the type disclosed herein, the description of the present invention will be confined to the sealing of the major flaps 13 and 14 at the ends of the carton.

In a machine in accordance with the present invention, the erected, open-ended carton shown in FIG. 1 is first loaded with the goods to be packaged, say with a sealed bag containing beans, and then the loaded, open-ended carton is conveyed through a folding station in which first the dust flaps 11 and 12 on both ends are folded in, after which the lower major flap 13 is folded upwardly to overlap the folded-in dust flaps and the upper major flap is folded downwardly over the lower major flap, as a result of which the upper edge of the lower flap is retained in the fold of the folded-down upper flap.

When the carton leaves the folding station, the folded down upper major flap, since it is not yet bonded to the lower major flap, hinges outwardly, as shown in FIG. 5, to define with respect to the folded-in lower major flap an open-ended triangular shed S. Not until the sealing is effected does the carton have the completed appearance shown in FIG. 2.

The Carton Sealing System: Referring now to FIGS. 3 and 4, there is shown a carton sealing system in accordance with the invention in which unsealed cartons $C_u$ are conveyed by means of a belt 15 or other transport means successively through a folding station FS, a heating station HS and a compression station CS. The completed cartons discharged from the compression station are sealed and are therefore designated $C_s$.

Conveyor belt 15 is supported between a driven roll 16 and an idler roll 17, the belt being advanced by means of a motor whose operation is controlled by a motor control circuit 18. This circuit includes means responsive to a control signal applied at input 18A to arrest the operation of the motor. The motor control circuit also includes means to generate an output signal at output 18B, indicative of the fact that the motor has stopped, which output signal is used to extinguish the burners.

Inasmuch as the operations carried out in folding station FS is common to existing types of sealing machines, including the heated-air type mentioned in the Background section, there is no need to disclose the structure of this station in detail. It is sufficient to say that at this station, each open-ended tubular carton conveyed therethrough contains a load previously introduced therein at a loading station, the dust flaps at the ends being first folded in, after which the lower major flap is folded over the dust flaps and the upper major flap is folded down to create the open-ended triangular shed S.

The heating station HS includes a pair of identical gas burners 19 and 20 mounted on adjustable brackets in spaced parallel relation. The burners are supplied with a suitable gas-air mixture through pipes 19A and 20A coupled to a signal-controlled valve 21, such as an electromagnetically actuated valve included in a flame control system 22 for the burners. Each burner is adapted to establish a row of flames at a position corresponding to a respective carton shed passing thereover.

Associated with burners 19 is a cooled rail 23 and with burners 20 is a cooled rail 24 parallel to rail 23, the two rails being in the form of pipes which conduct cold water. The cooled rails are positioned to engage the outstretched upper major flaps of the cartons passing through the heating station and to retain them at a predetermined angle with respect to the folded-in lower major flap so that all sheds S passing through this station have the same geometry.

As shown separately in FIG. 10, each burner includes a hollow casing 25 having a longitudinal slot within which is mounted a main stack of corrugated ribbons 26 in side-by-side relation. These ribbons create a series of spaced ports through which the gas-air mixture is forced in jet form. The mixture is constituted by a combustible hydrocarbon gas and compressed air which is fed through separate lines into the fuel control system 22.

The configuration of the ribbons is such as to provide two distinct types of jet ports, one being of the high velocity type causing the gas mixture to project with sufficient energy to form a long flame extending to a point remote from the burner, the other jet ports being of the low velocity type to produce relatively short pilot flames for sustaining the long flames.

Burners of this preferred type are disclosed in the Flynn U.S. Pat. Nos. 2,499,482; 2,521,988 and 3,499,720. As explained in these patents, the gas emerging from the high velocity jets has a velocity greater than the rate of flame propagation of the gas so that the flame would not continue in the absence of a pilot flame to support combustion.

At either end of the main ribbon stack 26 are minor pilot-flame ribbon stacks 27 and 28, minor stack 27 cooperating with a spark plug igniter 29 as shown in FIGS. 3 and 7, and minor stack 28 cooperating with a ionization or any other known type of flame sensor 30. Igniter 29 is connected to an ignition transformer 31 which is operated by the flame control system 22, so that while the gas-mixture is to be ignited, the ignition transformer is energized to produce a high voltage which is applied to the electrode of the spark plug to produce a spark across the gap therebetween for igniting the mixture. Because the jets of the burners extend longitudinally, the resultant flames are in a row formation at positions corresponding to the sheds of the cartons passing thereover.

Each sensor 30 produces a signal which is indicative of the presence or absence of a flame at the associated burner. The sensors are connected to the motor control system 18, whereby in the event either of the burner flames is extinguished for any reason, the motor operation is halted in order to prevent cartons from passing through the heating station without heat treatment of the flaps.

Thus the system includes two interlocks, the first serving to shut off the gas-mixture to the burners should the motor stop, and the second serving to shut off the motor should the flames be extinguished. The first interlock, therefore, prevents a carton halted at the heating station from being burned by the flames, and the second interlock prevents a carton moving through the station from leaving the station without being heated. Unless the carton flaps are heated, no sealing will take place at the compression station.

When the system is functioning properly, the flames from burners 19 and 20 project into the sheds S at either end of the advancing cartons, as shown in FIG. 5, and impinge both the layer of polyethylene formed on the inner surface of upper flap 14 and the layer of polyethylene formed on the outer surface of lower flap 15 to soften these layers preparatory to compression. In compression, the two softened layers are pressed together to form a permanent bond at the interface of the flaps when the layers freeze and harden at room temperature.

It is important that the height, the profile and the intensity of the flames be such relative to the geometry of the sheds and the thermoplastic properties of the polyethylene layers that at the speed of uninterrupted carton movement through the heating station, sufficient heat is supplied to adequately soften these layers prior to compression, and that the heat not be more than sufficient for this purpose in order to avoid burning the flaps and not be less than sufficient in order to avoid inadequate softening of the flaps.

Inasmuch as with burners of the type described, it is possible to "fine tune" the flames and to maintain a set flame condition, the flame parameters may be accurately coordinated with the other factors which come into play in efficient high speed sealing operations. It has been found that an oxidizing flame such as one having 10 parts of air to one part of natural gas produces a better and stronger seal than a reducing flame. The gas-air mixture being emitted from the burners fills the triangular shed as it burns, making intimate contact with the thermoplastic surfaces and releasing heat from the ionization of the gas-air mixture.

In the compression station CB, the cartons $C_u$, whose open sheds have been heat-treated, pass between two parallel rows 32 and 33, each row being formed by a series of vertically mounted rolls which engage the outstretched upper major flaps 14 and press these flaps against the lower major flaps 13, thereby causing the softened layers on these flaps to make interfacial contact with each other and fuse together. As the cartons move through the compression station, the softened layers cool and harden to form a permanent bond so that the cartons $C_s$ leaving the compression station are fully sealed.

While there has been shown and described a preferred embodiment of an automatic carton sealing system in accordance with the invention, it will be appreciated that many changes and modifications may be made therein without, however, departing from the essential spirit thereof.

For example, while the compression rollers are shown as cylindrical in form, in practice it has been found desirable to use barrel-shaped rollers, for these give better compression in the center of the carton while still maintaining adequate pressure at the top and bottom of the carton where the paper-board is stiff.

I claim:

1. In a system for sealing tubular cartons having at either end a pair of dust flaps, a lower major flap and an upper major flap, the dust flaps being folded in and the lower flap being folded over the dust flap, the upper edge of the lower flap being retained in the fold of the upper flap which is partially folded over the lower flap and extends outwardly therefrom to define an open-ended triangular shed, the interfacial surfaces of the major flaps having thermoplastic layers therein, the combination comprising:

A. a heating station including a pair of gas burners disposed in parallel relation and producing two rows of flames at positions corresponding to said sheds, each burner including a deck of corrugated metallic ribbons providing an array of jets through which gas escapes, B. a compression station having means to press said upper major flaps against said lower major flaps, and C. means to convey said cartons successively through said heating station and compression station, whereby said sheds pass over said burners and said flames impinge on the interfacial surfaces to soften said layers, and then the upper flaps are pressed against the lower flaps and the layers therein freeze to form a permanent bond.

2. The combination as set forth in claim 1, wherein said gas burners are supplied with a gas-air mixture through a signal-controlled valve, and said means to convey said cartons includes a motor and a control circuit therefor adapted to produce a signal when the motor ceases to function, which signal is applied to said valve to immediately cut off the mixture to said burners and thereby extinguish the flames.

3. The combination as set forth in claim 1, wherein said heating station further includes a pair of cooled rails in parallel relation adapted to engage the outwardly extended upper flaps to maintain them in predetermined positions.

4. A combination as set forth in claim 1, wherein said compression station is constituted by a pair of spaced assemblies, each including a series of vertically mounted rollers.

5. The combination as set forth in claim 1, wherein said burners are constituted by a hollow casing having a slot and a group of corrugated metallic ribbons in said slot to provide an array of ports for the escape of gas from the interior of said casing.

6. The combination as set forth in claim 5, wherein a portion of said gas ports permit the gas to project at high velocity to produce long flames, and the remaining portion of said ports permit the gas to escape at low velocity to produce pilot flames.

7. The combination as set forth in claim 2, wherein said burners further include a sensor to detect the presence of a flame and to produce a control signal in the absence of a flame, and means to apply said control signal to the motor control circuit to halt the operation of the motor should said flame be extinguished.

8. A system for sealing tubular cartons having at either end a pair of dust flaps, a lower major flap and an upper major flap, the interfacial surfaces of the major flaps having polyethylene layers therein, said system comprising:

A. a folding station having means to first fold in the dust flaps and then to fold the lower major flap over the folded-in dust flaps and to partially fold the upper major flap over the lower major flap, whereby the upper flap extends outwardly with respect to the lower flap to define an open-ended triangular shed;

B. a heating station including a pair of gas burners disposed in parallel relation and means to supply a gas-air mixture to said burners to produce two rows of flames at positions corresponding to said sheds, each burner including a deck of corrugated metallic ribbons providing an array of jets through which gas escapes;

C. a compression station having means to press said upper major flaps against said lower major flaps; and D. means including a motor and a motor control circuit to convey each carton to be sealed successively through said folding station, said heating station and said compression station, whereby after said sheds are formed at the folding station they pass over said burners in the heating station and said flames impinge on the interfacial surfaces to soften said layers and then the upper flaps are pressed against the lower flaps in the compression station and the layers therein freeze to form a permanent bond.

9. A system as set forth in claim 8, wherein the ratio of gas to air in said mixture is such as to produce an oxidizing flame.

10. A system as set forth in claim 8, including a first interlock in said motor control circuit coupled to a signal-operated valve interposed in said means to supply a gas-mixture to said burners to actuate said valve and cut off said mixture to extinguish the flames in the event motor operation is halted.

11. A system as set forth in claim 10, including a second interlock in said motor control circuit coupled to a sensor to detect the presence of flames in said burners to arrest the motor should either of said flames become extinguished.

* * * * *